(12) United States Patent
Kim (10) Patent No.: US 7,997,812 B2
(45) Date of Patent: Aug. 16, 2011

(54) CAMERA MODULE

(75) Inventor: Min Soo Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 652 days.

(21) Appl. No.: 11/997,551

(22) PCT Filed: Aug. 8, 2007

(86) PCT No.: PCT/KR2007/003810
§ 371 (c)(1),
(2), (4) Date: Jan. 31, 2008

(87) PCT Pub. No.: WO2008/023894
PCT Pub. Date: Feb. 28, 2008

(65) Prior Publication Data
US 2010/0158508 A1  Jun. 24, 2010

(30) Foreign Application Priority Data

| | | |
|---|---|---|
| Aug. 22, 2006 | (KR) | 10-2006-0079490 |
| Dec. 7, 2006 | (KR) | 10-2006-0123737 |
| Mar. 30, 2007 | (KR) | 10-2007-0031304 |
| Apr. 2, 2007 | (KR) | 10-2007-0032166 |
| Apr. 12, 2007 | (KR) | 10-2007-0035811 |

(51) Int. Cl.
*G03B 17/00* (2006.01)
*G03B 7/02* (2006.01)
*H04N 5/225* (2006.01)

(52) U.S. Cl. .......... 396/529; 348/340; 359/819
(58) Field of Classification Search .......... 396/529, 396/133; 348/340, 357; 359/819, 823, 824
See application file for complete search history.

(56) References Cited

U.S. PATENT DOCUMENTS

| | | | |
|---|---|---|---|
| 6,900,843 | B1 | 5/2005 | Uchiyama |
| 7,092,031 | B1* | 8/2006 | Wiedemann ............ 348/374 |
| 2005/0035421 | A1 | 2/2005 | Kayanuma et al. |
| 2006/0171704 | A1 | 8/2006 | Bingle et al. |
| 2006/0181633 | A1* | 8/2006 | Seo ........................ 348/340 |
| 2006/0189183 | A1 | 8/2006 | Yang |

FOREIGN PATENT DOCUMENTS

| | | |
|---|---|---|
| EP | 1944807 A1 | 7/2008 |
| JP | 2002-247425 | 8/2002 |
| JP | 2005-303550 | 10/2005 |

* cited by examiner

*Primary Examiner* — Rochelle-Ann J Blackman
(74) *Attorney, Agent, or Firm* — Saliwanchik, Lloyd & Eisenschenk (57) ABSTRACT

A camera module is provided with a lens part including a lens and a lens barrel, a holder coupled with the lens part and formed with a first conductive layer, and a printed circuit board electrically connected to the first conductive layer while supporting the holder.

17 Claims, 10 Drawing Sheets

CAMERA MODULE

CROSS-REFERENCE TO RELATED APPLICATION

This application is the U.S. national stage application of International Patent Application No. PCT/KR2007/003810, filed Aug. 8, 2007, the disclosure of which is hereby incorporated by reference in its entirety.

TECHNICAL FIELD

The embodiment relates to a camera module.

BACKGROUND ART

With the advance of a communication technology and a digital information processing technology, a portable terminal has been developed with various functions, such as information process and operation, communication, and image information input/output. Such a portable terminal is equipped with a camera module to obtain an image. In the case of the portable terminal equipped with the camera module, electromagnetic interference (EMI), radio frequency (RF) noise, and thermal noise damage an input/output radio wave, and exert a bad influence on radio sensitivity.

DISCLOSURE

Technical Problem

The embodiment provides a camera module, capable of effectively blocking the EMI, RF noise, and thermal noise.

Technical Solution

According to the embodiment, a camera module comprises a lens part comprising a lens and a lens barrel, a holder coupled with the lens part and formed with a first conductive layer, and a printed circuit board electrically connected to the first conductive layer while supporting the holder.

According to the embodiment, a camera module comprises a sensor part comprising a lens part comprising a lens and a lens barrel, a holder coupled with the lens part, a first printed circuit board disposed with an image sensor while supporting the holder, and a first conductive layer formed on the first printed circuit board; a second printed circuit board connected to the sensor part; and a connector connected to the second printed circuit board.

According to the embodiment, a camera module comprises a lens part comprising a lens, a lens barrel, and an actuator; a holder coupled with the lens part, in which a first conductive layer is formed on a surface of the holder; and a printed circuit board electrically connected to the first conductive layer while supporting the holder.

ADVANTAGEOUS EFFECTS

A camera module according to the embodiment can effectively block EMI, RF noise, and thermal noise.

MODE FOR INVENTION

Hereinafter, the embodiment will be described with reference to accompanying drawings.

Figure 1:
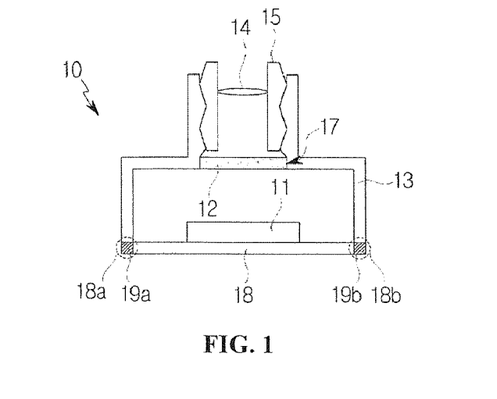
FIG. 1 is a sectional view showing a camera module according to the embodiment.

FIG. 1 is a sectional view showing a camera module according to the embodiment. A camera module 10 according to the embodiment comprises an image sensor 11, a holder 13, a lens barrel 15, and a printed circuit board 18. The holder 13 is disposed on the printed circuit board 18. An opening part 17 is formed in the holder 13 to expose the image sensor 11. An IR filter 12 may be provided in the opening part 17 to block an external infrared ray. In addition, a connector may be connected to the printed circuit board 18 to deliver an optical signal generated by the image sensor 11 to a main board. A lens barrel 15 is fixed into the inner side wall of the holder 13 to fix the lens 14. As shown in FIG. 1, the lens barrel 15 may be formed in a screw structure, or a straight structure.

According to the embodiment, a conductive layer may be formed on the surface of the holder 13. For example, the conductive layer may be formed by coating a conductive material. Accordingly, the surface of the holder 13 can maintain a conduction state. For example, in order to smoothly maintain the conduction state of the surface of the holder 13, the surface resistance of the holder 13 must be 1 ohm or less. This can be realized by coating a conductive pigment having low resistance on the surface of the holder 13.

The holder 13 makes contact with outer peripheral areas 18a and 18b of the printed circuit board 18. The outer peripheral areas 18a and 18b of the printed circuit board 18 have a structure in which a circuit pattern is not formed, but solder resist is opened.

The solder resist is formed in order to prevent an etching solution, a plating solution, and lead from being penetrated. The solder resist is a coating portion used to protect a specific area from the etching solution, the plating solution, and the soldering during the manufacturing process and the test process.

Accordingly, when the solder resist is removed (opened) from the outer peripheral areas 18a and 18b of the printed circuit board 18, the surface of the outer peripheral areas 18a and 18b of the printed circuit board 18 may be grounding areas. In addition, the bottom surface of the holder 13 coated by the conductive pigment can make contact with portions (the grounding areas) from which the solder resist is removed.

Accordingly, when the holder 13 having the surface coated by the conductive material is provided at the outer peripheral areas 18a and 18b of the printed circuit board 18 from which the solder resist is removed, the holder 13 makes contact with the surfaces of the outer peripheral areas 18a and 18b of the printed circuit board 18. As a result, the holder 13 is conducted with the outer peripheral areas 18a and 18b of the printed circuit board 18, so that the surface of the holder 13 maintains a ground state. The surface of the holder 13 maintains the ground state, thereby effectively preventing EMI and RF noise.

The holder 13 may be fixed to two points of the printed circuit board 18 by boss pins 19a and 19b. The holder 13 makes point contact with the printed circuit board 18 by the boss pins 19a and 19b. In addition, the lower surface of the holder 13 makes surface contact with the outer peripheral areas 18a and 18b of the printed circuit board 18.

Accordingly, the ground state of the holder 13 can be effectively maintained by the point contact and the surface contact. The detailed description thereof will be given with reference to FIGS. 2 and 3 below.

Figure 2:
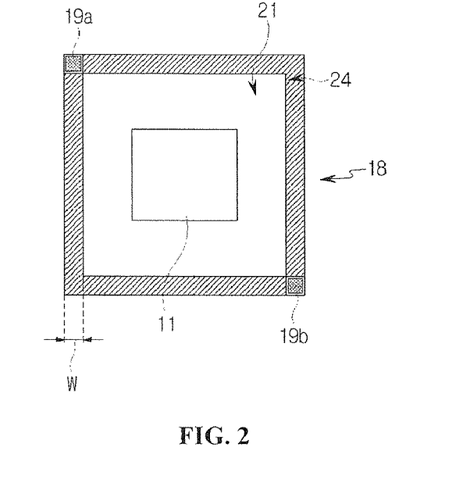
FIG. 2 is an upper plan view a printed circuit board employed for a camera module according to the embodiment.
Figure 3:
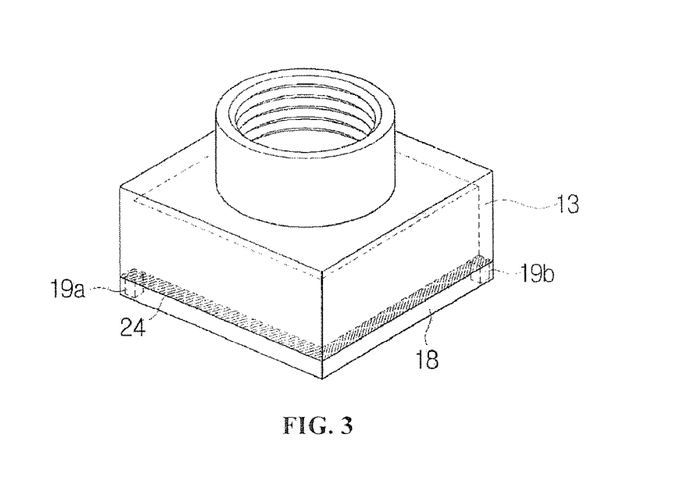
FIG. 3 is a perspective view showing a holder provided on a printed circuit board in a camera module according to the embodiment.

FIG. 2 is an upper plan showing view the printed circuit board employed for the camera module according to the embodiment, and FIG. 3 is a perspective view showing the holder provided on the printed circuit board in the camera module according to the embodiment.

In the camera module according to the embodiment, various passive elements and circuit patterns are formed in a circuit pattern area 21 of the printed circuit board 18. The holder 13 is provided on the printed circuit board 18, and the image sensor 11 is provided in the center portion of the printed circuit board 18.

The printed circuit board 18 has a circuit pattern only in the circuit pattern area 21 positioned inside the area where the holder 13 is provided. In addition, the outer peripheral area 24 including the holder 13 attached thereto has a structure in which the solder resist is removed (opened) without forming the circuit pattern. In detail, the outer peripheral area 24 of the printed circuit board 18 maintains a ground state without forming a circuit pattern. The outer peripheral area 24 of the printed circuit board 18 may have a width w corresponding to the thickness of the lower portion of the holder 13, such that the solder resist can be removed by the width w.

According to the embodiment, the holder 13 may be fixed to the printed circuit board 18 by using the boss pins 19a and 19b. The boss pins 19a and 19b serve as fixing pins to support the holder 13 on the printed circuit board 18 at two lower end portions of the holder 13. The boss pins 19a and 19b are integrally formed with the holder 13 in the form of two pins at the lower portion of the holder 13.

According to the embodiment, a predetermined conductive material may be coated on the surface of the boss pins 19a and 19b to fix and support the holder 13. The boss pins 19a and 19b formed at the surface thereof with the conductive layer are fixed and supported on the printed circuit board 18, and makes point contact with the outer peripheral area 24 of the printed circuit board 18.

The holder 13 maintains a ground conduction state through the point contact. According to the embodiment, the boss pins 19a and 19b may maintain a ground state. In addition, since the solder resist is removed from the outer peripheral area 24 of the printed circuit board 18, the potential difference does not exist between the surface of the holder 13 and the outer peripheral area 24 of the printed circuit board 18. Accordingly, a ground state can be effectively maintained at the surface of the holder 13 like the outer peripheral area 24 of the printed circuit board 18.

According to the embodiment, a ground state is maintained at the surface of the holder 13, thereby effectively preventing EMI and RF noise.

Meanwhile, RF noise and thermal noise can occur even in a connector area and an FPCB connected to a sensor part in addition to an area (the sensor part) equipped with an image sensor. The embodiment suggests a scheme of preventing RF noise and thermal noise in the sensor part, the FPCB, and the connector area.

Figure 4:
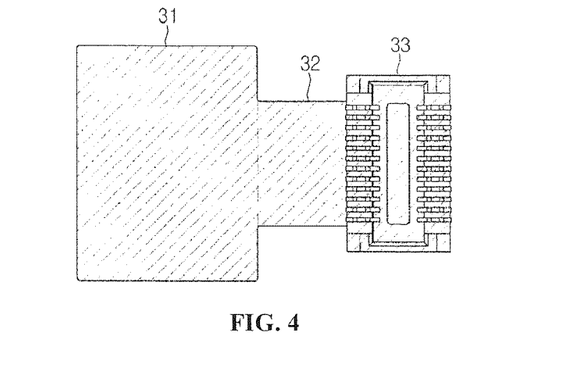
FIG. 4 is a view showing a camera module according to the embodiment, in which a sensor part, an FPCB, and a connector are connected to each other.

FIG. 4 is a view showing the camera module according to the embodiment, in which the sensor part, the FPCB, and the connector are connected to each other.

The sensor part 31 processes light incident through a lens to convert it into electrical signals. The sensor part 31 comprises lens to condense light, an image sensor, an PCB provided with a circuit pattern, and a holder provided on the PCB. In addition, the signal of the sensor part 31 generated from the image sensor is delivered to the connector 33. The sensor part 31 may be connected with the connector 33 by the FPCB 32.

According to the embodiment, a conductive layer may be formed on the bottom surfaces of the sensor part 31 and the connector 33. For example, silver paste, which is a conductive material, may be coated on the bottom surfaces. In addition, a conductive material (e.g., silver paste) may be coated on both sides of the FPCB 322 to connect the sensor part 31 with the connector 33.

The silver paste is an electromagnetic shielding material used as a conductive adhesive, or a coating material because the silver paste is chemically stable among compound conductive paste. For example, a silver paste layer is formed on the bottom surface of the sensor part 31 and the bottom surface of the connector 33, and at both sides of the FPCB 32, thereby effectively preventing RF noise and thermal noise introduced through the camera module.

If a silver paste layer is formed on the bottom surface of the sensor part 31 and the bottom surface of the connector 33, and at both sides of the FPCB 32, RF noise and thermal noise generated from an exterior may be prevented by the silver paste layer. The RF noise and the thermal noise do not exert an influence on circuits of the sensor part 31, the FPCB 32, and the connector 33, and are transmitted to an exterior through a ground area formed at the lower portion thereof. Accordingly, the communication fault caused by an external electromagnetic wave and the erroneous operation of a circuit caused by noise may be prevented.

Figure 5:
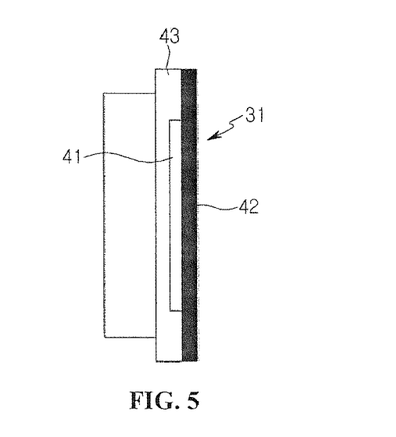
FIG. 5 is a view showing a sensor part provided in a camera module according to the embodiment.
Figure 6:
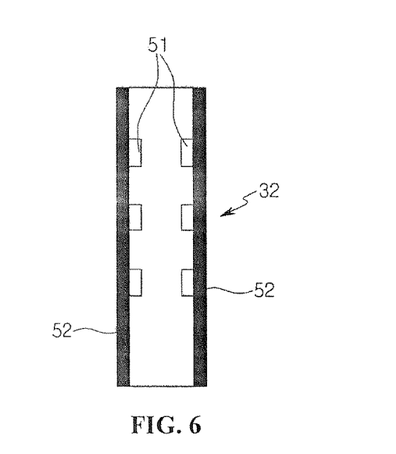
FIG. 6 is a view showing a FPCB provided in a cameral module according to the embodiment.
Figure 7:
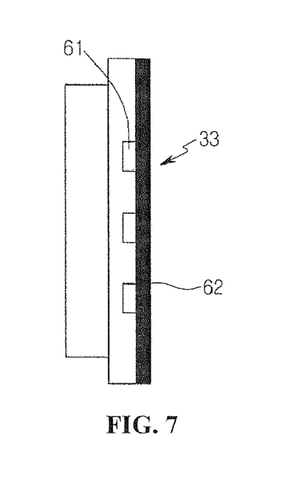
FIG. 7 is a view showing a connector provided in a cameral module according to the embodiment.

Hereinafter, the embodiment will be described in detail with reference to FIGS. 5 to 7. FIG. 5 is a view showing the sensor part 31 formed at the bottom surface with a silver paste layer 42 according to the embodiment. If RF noise and thermal noise are introduced into the silver paste layer 42 coated on the bottom surface of the printed circuit substrate 43, noise is discharged through the grounding area 41 making contact with the silver paste layer 42.

The grounding area 41 of the printed circuit board 43 may be formed by removing the solder resist. In addition, the silver paste layer 42 is formed on the bottom surface of the printed circuit board 43. For example, the silver paste layer 42 may be formed through a coating process. In this case, the grounding area 41 must be ensured as wide as possible by removing solder resist from an area wide as possible. In addition, the GND via is ensured as numerous as possible, thereby forming the shortest path and improving the efficiency of the conductivity.

In addition, as shown in FIG. 5, the solder resist may be removed, and the silver past layer 42 may be formed only in a portion of the printed circuit board 43. The solder resist is removed from the bottom surface of the printed circuit board 43, and the silver paste layer 42 may be formed on the bottom surface of the printed circuit board 43. Meanwhile, FIG. 6 is a sectional view showing the FPCB 32, and FIG. 7 is a sectional view showing the connector 33.

It can be recognized that the silver paste layer 52 is formed at both sides of the FPCB 32, and the silver paste layer 62 is formed on the bottom surface of the connector 33. Similarly, the solder resist is removed such that the FPCB 32 and the connector 33 obtain the grounding areas 51 and 61 as wide as possible. In addition, the shortest path may be formed, and the conductivity may be maximized even when the GND via must be ensured as numerous as possible. Although it is recognized from FIG. 6 that silver paste layers 52 are formed on the top and bottom surfaces, the silver paste layer 52 may be formed only at one surface of the FPCB 32 instead of both side surfaces of the FPCB 32.

According to the embodiment, when RF noise and thermal noise are introduced into the silver paste layers 52 and 62, the RF noise and the thermal noise are discharged through the grounding areas 51 and 61 making contact with the silver paste layers 52 and 62.

In addition, according to the embodiment, a conductive layer may be formed on the surfaces of an actuator and a holder in order to effectively prevent EMI noise and RF noise. The above embodiment will be described with reference to FIGS. 8 to 12.

Figure 8:
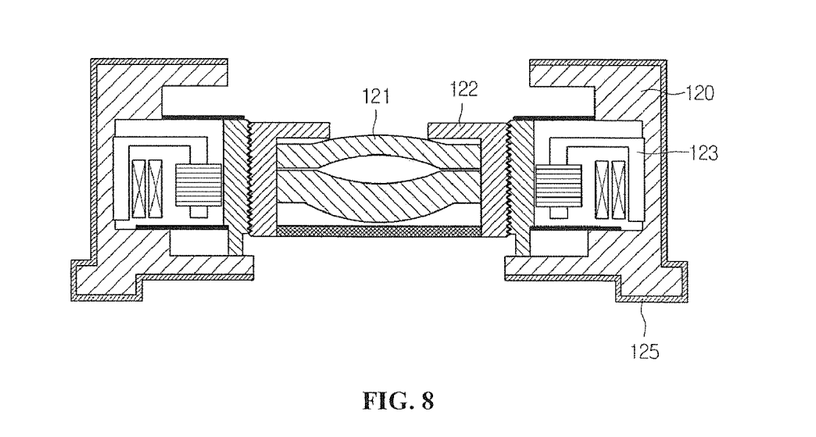
FIG. 8 is a side sectional view schematically showing a lens part according to the embodiment.
Figure 9:
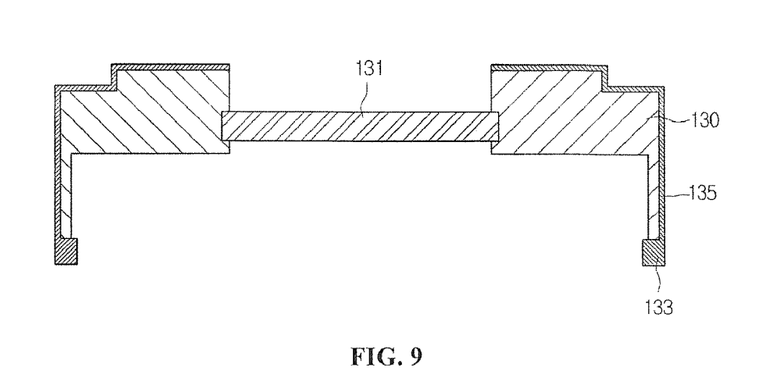
FIG. 9 is a side sectional view schematically showing a holder according to the embodiment.
Figure 10:
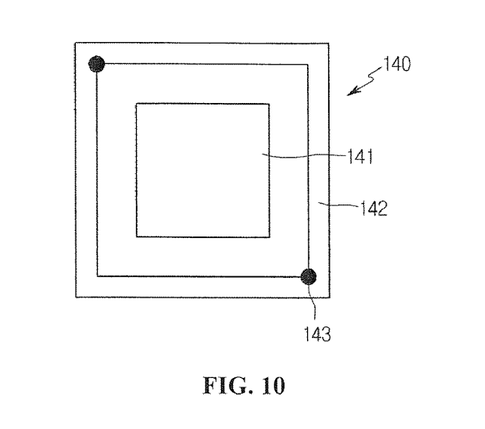
FIG. 10 is a plan view showing a printed circuit board according to the embodiment.

The camera module according to the embodiment comprises a lens part, a holder, and a printed circuit board. FIG. 8 is a side sectional view schematically showing the lens part according to the embodiment, FIG. 9 is a side sectional view schematically showing the holder according to the embodiment, and FIG. 10 is a plan view showing the printed circuit board according to the embodiment.

A lens part 120 comprises a lens barrel 122 equipped with a lens 121 and an actuator 123 coupled with the lens barrel 122. The lens barrel 122 may be provided with at least one lens 121. The lens 121 condenses light onto an image sensor 141.

The actuator 123 is coupled with the lens barrel 122 to adjust a focus by tuning the position of the lens 121. Accordingly, the actuator 123 can have an automatically focus adjusting function and an optical zoom function. The actuator 123 can use one of a piezoelectric device, a stepping motor, or a voice coil motor (VCM).

A conductive layer 125 is formed on the interface between the holder 130 and the outer peripheral surface of the lens part 120. The conductive layer 125 is formed on the outer peripheral surface of the lens part 120, thereby preventing an electromagnetic wave generated from the actuator 123 from affecting an external device. In addition, when the lens part 120, the holder 130, and the printed circuit board 140 are coupled with each other, conductive epoxy may be used.

According to the embodiment, since the electromagnetic wave generated from an external device cannot exert an influence on the actuator 123, EMI and RF noise can be effectively prevented. In addition, the conductive layer 125 is formed even on the surface of the lens part 120 contacted with the holder 130, thereby preventing the image sensor positioned at the lower portion of the holder 130 from being affected by the EMI and RF noise.

The holder 130 is positioned at the lower portion of the lens part 120. The holder 130 comprises an IR blocking filter 131. A conductive layer 135 is formed on the interface between the outer peripheral surface of the holder 130 and the lens part 120.

The conductive layer 135 is formed on the outer peripheral surface of the holder 130, thereby blocking EMI and RF noise caused by the electromagnetic wave generated from an external device and the electromagnetic wave generated from the image sensor 141.

In addition, since the conductive layer 135 is formed on the surface of the holder 130 contacted with the lens part 120, it is possible to prevent the electromagnetic wave generated from the actuator 123 of the lens part 120 from being introduced into devices such as the image sensor 141.

In addition, a boss pin 133 formed with the conductive layer 135 may be provided at the lower portion of the holder 130. The boss pin 133 may be inserted into a grounding hole 143 of the printed circuit board 140.

Figure 11:
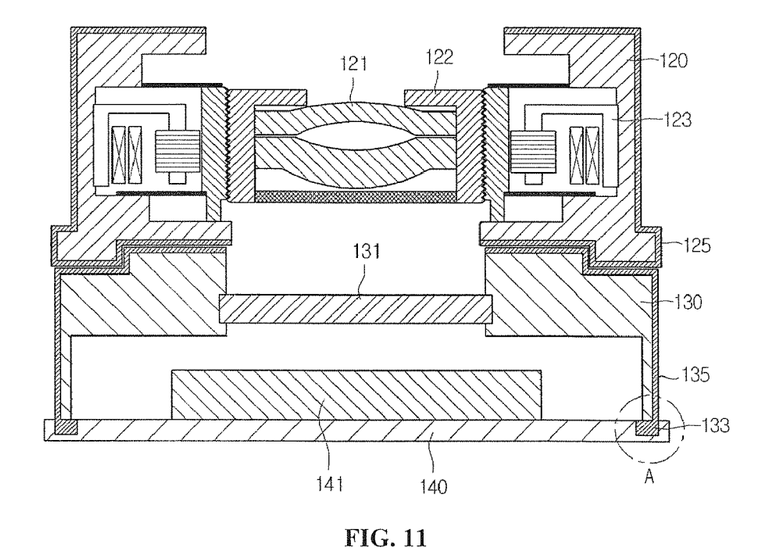
FIG. 11 is a side sectional view schematically showing a camera module according to the embodiment.
Figure 12:
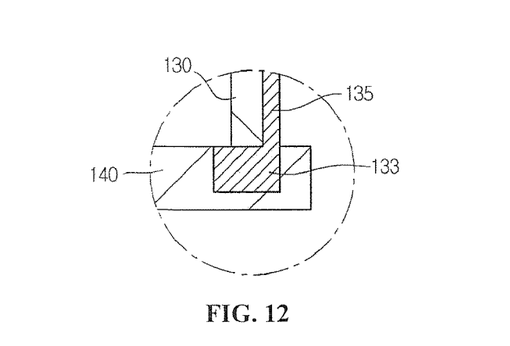
FIG. 12 is an enlarged view of "A" shown in FIG. 11.

The printed circuit board 140 comprises the image sensor 141, the grounding hole 143, and a grounding pattern 142. For example, the grounding pattern 142 may be formed by removing the solder resist coated on the printed circuit board 140. The grounding hole 143 is formed corresponding to the boss pin 133 formed at the lower portion of the holder 130. The boss pin 133 is inserted into the grounding hole 143 and grounded. FIG. 11 is a view showing the camera module according to the embodiment, in which the lens part 120, the holder 130, and the printed circuit board 140 are coupled to each other, and FIG. 12 is an enlarged view of a "A" part shown in FIG. 11.

The conductive layers 125 and 135 are formed at the outer peripheral surfaces of the lens part 120 and the holder 130. In addition, the boss pin 133 formed at the lower portion of the holder 130 is inserted into the grounding hole 143 of the printed circuit board 140. The outer peripheral surface of the holder 130 and the lens part 120 formed with the conductive layers 125 and 135 are grounded. Thus, various noises can be blocked.

According to the embodiment, a conductive cap may be employed for the camera module in order to more effectively block the EMI and RF noise. The embodiment will be described with reference to FIGS. 13 to 18.

Figure 13:
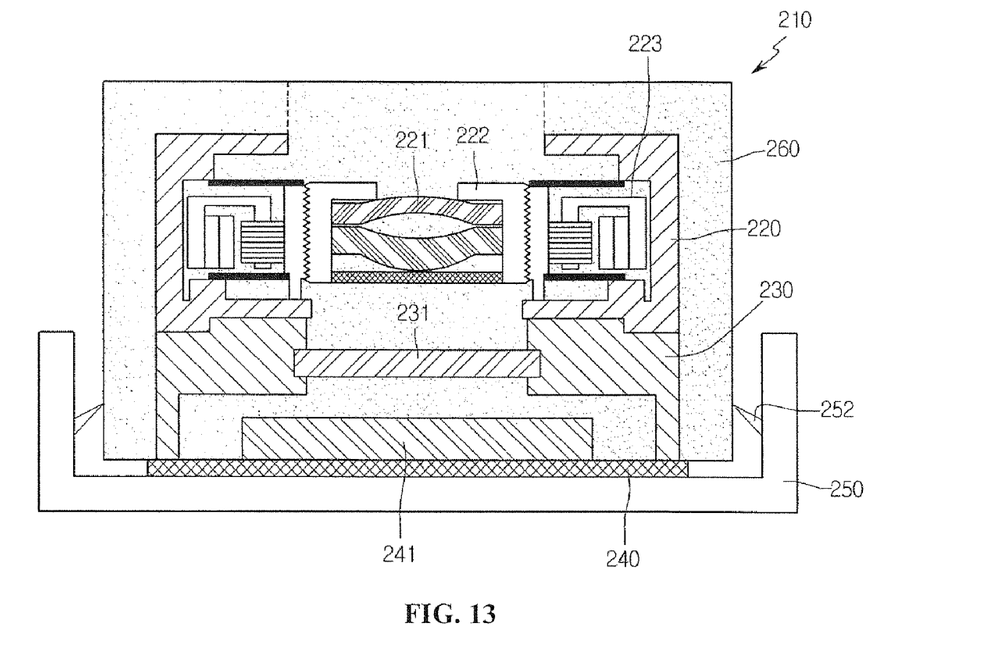
FIG. 13 is a side sectional view schematically showing a camera module according the embodiment.

FIG. 13 is a side sectional view schematically showing the camera module according the embodiment.

The lens part 220 comprises a lens barrel 222 including a lens 221 and an actuator 223 coupled with the lens barrel 222. The lens barrel 222 is coupled with at least one lens 221, and the lens 221 condenses light onto the image sensor 241.

The actuator 223 is coupled with the lens barrel 222, and adjusts the position of the lens 221 to tune a focus. Accordingly, the actuator 223 can have an automatic focus adjusting function and an optical zoom function.

The holder 230 is positioned at the lower portion of the lens part 220. The holder 230 may be provided with an IR blocking filter 231. The image sensor 241 is provided on the printed circuit board 240 to convert an optical signal into an electrical signal.

A cap 260 surrounds the outer peripheral surface of the lens part 220 and the holder 230. A socket 250 is provided at the lower portion of both the cap 260 and the printed circuit board 240. The cap 260 includes a conductive material, for example, metal. The socket 250 fixes the cap 260 thereto by using a pin 252, so that the cap 260 is grounded.

The cap 260 is coupled with the socket 250, so that the cap 260 makes contact with the pin 252. Accordingly, the cap 260 is grounded. And various noise caused by an external electromagnetic wave and noise radiated from the camera module 210 can be effectively blocked.

Figure 14:
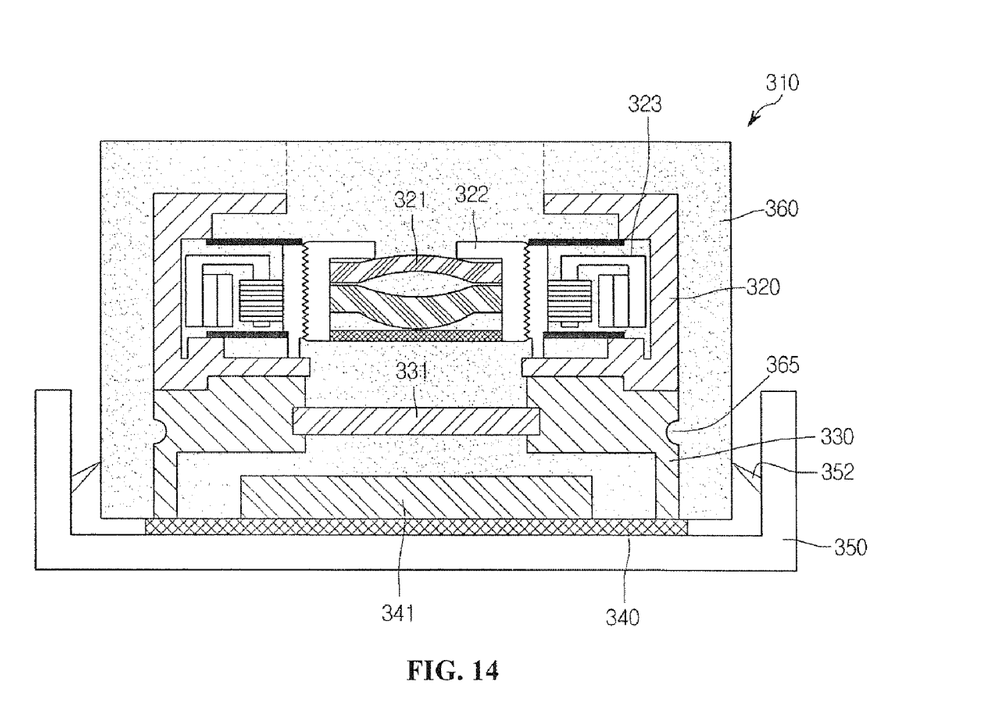
FIG. 14 is a side sectional view schematically showing a camera module according to another embodiment.

FIG. 14 is a side sectional view schematically showing a camera module according to another embodiment.

A lens part 320 comprises a lens barrel 322 including a lens 321 and an actuator 323 coupled with the lens barrel 322. At least one lens 321 is coupled with the lens barrel 322, and the lens 321 condenses light into an image sensor 341.

The actuator 323 is coupled with the lens barrel 322 such that the actuator 323 adjusts the position of the lens 321 to tune the focus of the lens 321. Accordingly, an automatic focus adjusting function and an optical zoom function can be realized. The holder 330 is positioned at the lower portion of the lens part 320, and comprises an IR blocking filter 331. In addition, a groove is formed at the outer side surface of the holder 330. A printed circuit board 340 is positioned at the lower portion of the holder 330. The image sensor 341 is provided on the printed circuit board 340.

A cap 360 having a protrusion 365 formed at the inner side surface of the cap 360 is formed along the outer peripheral surface of both the lens part 320 and the holder 330. A socket 350 is provided at the lower portion of both the cap 360 and a printed circuit board 340. The socket 350 fixes the cap 360 thereto, and grounds the cap 360. The cap 360 makes contact with a pin 352 of the socket 350, so that the cap 360 is grounded. The cap 360 includes a conductive material, for example, metal.

The cap 360 is grounded by making contact with the pin 352, so that various noise caused by an external electromagnetic wave and noise radiated from the camera module 310 can be effectively blocked.

Figure 15:
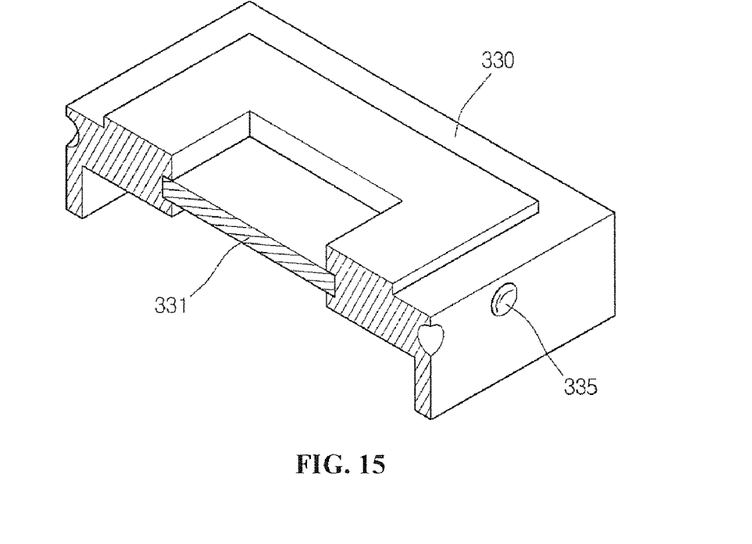
FIG. 15 is a vertical sectional view of a holder formed with a groove according to the embodiment.
Figure 16:
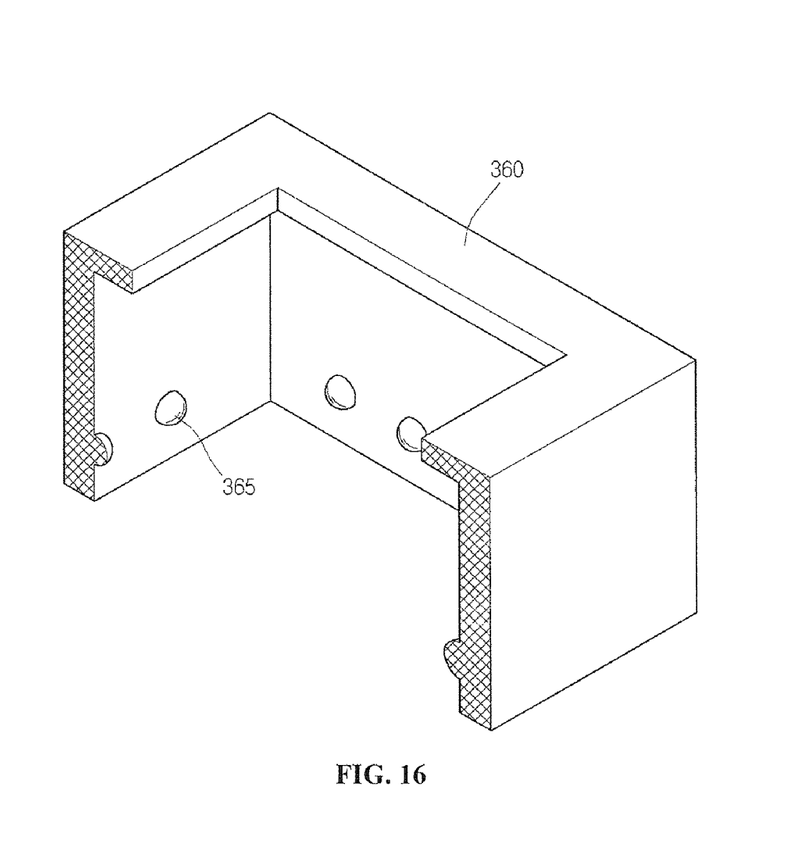
FIG. 16 is a vertical sectional view of a cap formed with a protrusion according to the embodiment.

A groove is formed in the holder 330, and the protrusion 365 is formed on the cap 360. This will be described with reference to FIGS. 15 and 16. FIG. 15 is a vertical sectional view of the holder formed with the groove according to the embodiment, and FIG. 16 is a vertical sectional view of the cap formed with the protrusion according to the embodiment.

A groove 335 having a hemisphere shape may be formed at the outer side surfaces of the holder 330 formed with the IR blocking filter 331. At least one groove 335 may be formed at the outer side surface of the holder 330.

The protrusion 365 corresponding to the groove 335 having a hemisphere shape is formed at an inner side surface of the cap 360. The protrusion 365 of the cap 360 is coupled with the groove 335 of the holder 330 so that a coupling force is enhanced, and the separation of the cap 360 from the holder 330 can be prevented in an impact test such as a drop test.

Figure 17:
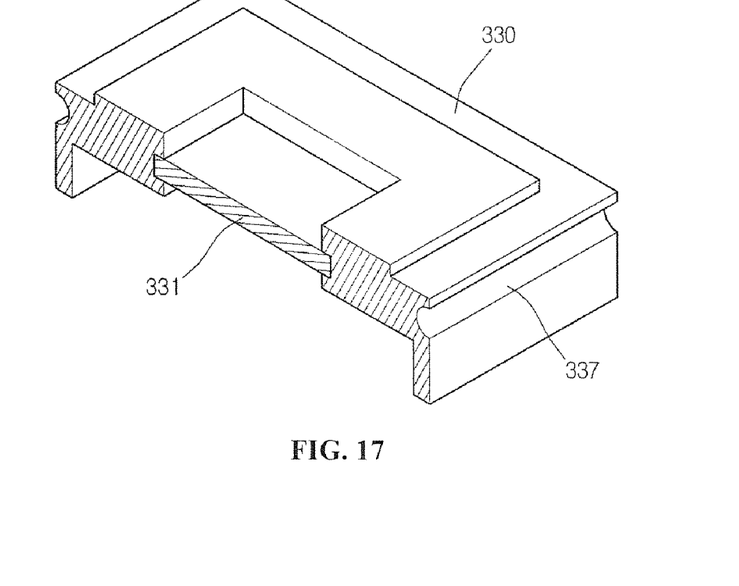
FIGS. 17 and 18 are views showing a groove and a protrusion according to another embodiment.
Figure 18:
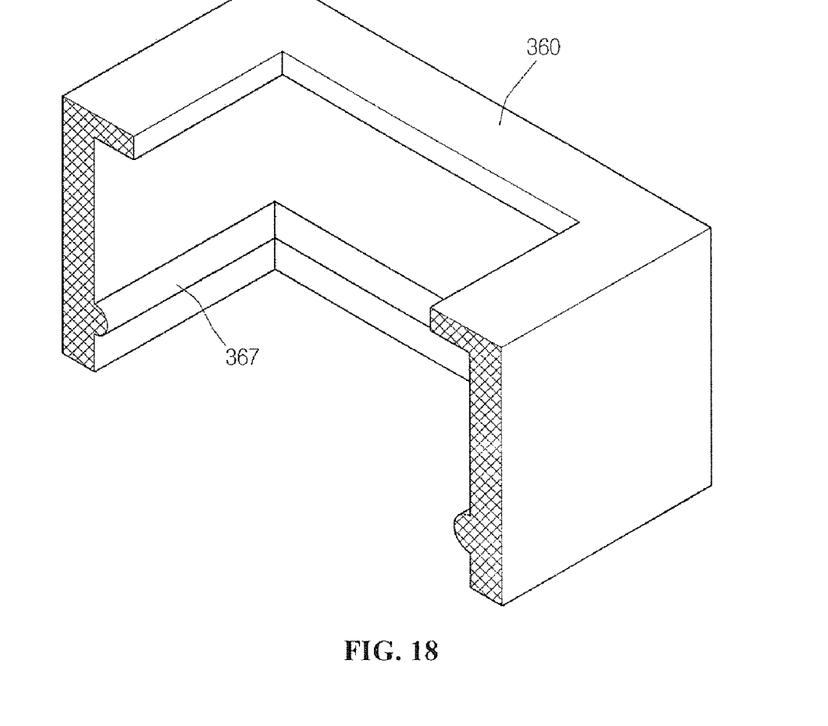

The groove 335 and the protrusion 365 may be variously formed in addition to a hemisphere shape. FIGS. 17 and 18 show a groove and a protrusion according to another embodiment.

A groove 337 having a cylindrical shape is formed at the outer side surface of the holder 330 formed with an IR blocking filter 331. At least one groove 337 may be formed at the outer side surface of the holder 330.

A protrusion 367 corresponding to the groove 337 having a cylindrical shape may be formed at the inner side surface of the cap 360. The protrusion 367 of the cap 360 is coupled with the groove 337 of the holder 330 so that a coupling force is enhanced, and the separation of the cap 360 can be prevented in an impact test such as a drop test.

FIGS. 19 to 26 are views showing a camera module according to another embodiment. A lens part 420 comprises a lens barrel 422 including a lens 421 and an actuator 423 coupled with the lens barrel 422. The lens barrel 422 is coupled with at least one lens 421. The lens 421 condenses light into an image sensor 441. A conductive material may be formed on the outer peripheral surface of the lens part 420.

Figure 19:
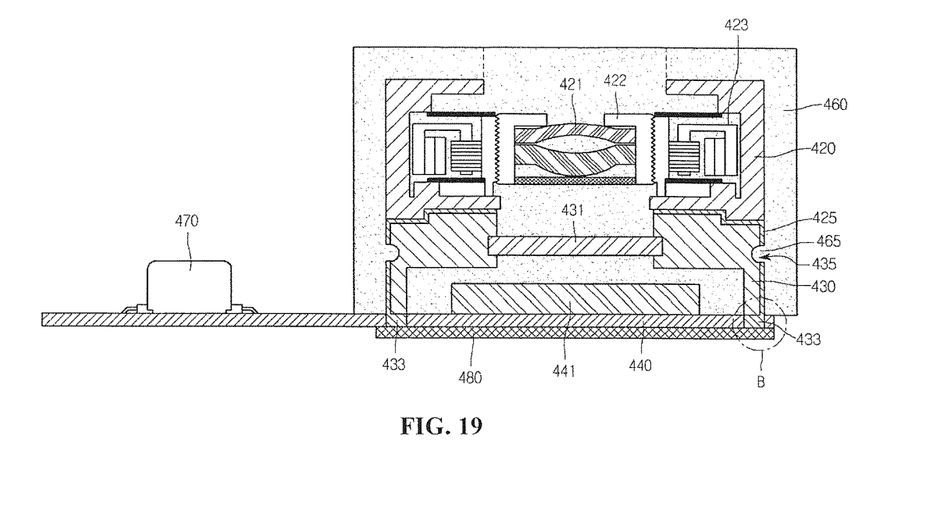
FIG. 19 is a side sectional view schematically showing a camera module according to the embodiment.

The actuator 423 is coupled with the lens barrel 422, and adjusts the position of the lens 421 to tune the focus of the lens 421. Accordingly, an automatic focus adjusting function and an optical zoom function can be realized by the actuator 423.

The holder 430 is positioned at the lower portion of the lens part 420, and comprises an IR blocking filter 431. In addition, a conductive layer 425 is formed on the contact surface of the holder 430 and the lens part 420 and the outer peripheral surface of the holder 430.

In addition, a groove is formed at the outer peripheral surface of the holder 430, and a boss pin 433 is formed at the lower portion of the holder 430. The image sensor 441 is provided on the printed circuit board 440. A connector 470 is formed on a printed circuit board 440 to deliver an image signal detected from the image sensor 441 to an exterior. The connector 470 is provided on the printed circuit board 440 at the outside of the holder 430, and connected to an external control device, for example, a controller of the camera module.

A conductive layer 480 is formed at the bottom surface of the printed circuit board 440. For example, the conductive layer 480 may be formed by coating a conductive material on the bottom surface of the printed circuit board 440. The conductive layer 480 may be grounded by directly making contact with a grounding pad of a portable appliance. The conductive layer 480 may adhere to the grounding pad by using a both-sided tape having conductivity. The conductive layer 480 may be formed by performing silver coating, or by coating silver paste.

The cap 460 covers the outer peripheral surface of the lens part 420 and the holder 430 except for the printed circuit board 440 and the upper portion of the lens 421. The inner side surface of the cap 460 can include a protrusion 465 corresponding to a groove 435 of the holder 430.

Since the cap 460 is formed, various noise caused by an external electromagnetic wave and noise radiated from the camera module may be effectively blocked. The cap 460 includes a conductive material, for example, metal.

Figure 20:
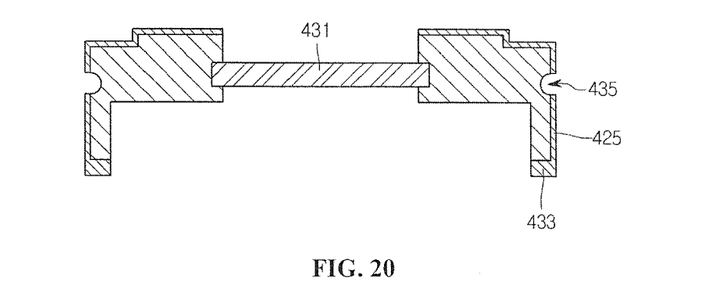
FIG. 20 is a side sectional view schematically showing a holder according to the embodiment.

FIG. 20 is a side sectional view schematically showing the holder according to the embodiment.

The holder 430 is positioned at the lower portion of the lens part 420, and the holder 430 is provided with the IR blocking filter 431. The conductive layer 425 is formed on the interface between the outer peripheral surface of the holder 430 and the lens part 420.

The conductive layer 425 is formed at the outer peripheral surface of the holder 430, thereby preventing an electromagnetic wave generated from an external device from affecting the image sensor 441 installed in the lower portion of the holder 430.

In addition, since the conductive layer 425 is formed even on the contact surface of the lens part 420 and the holder 430, an electromagnetic wave generated from an actuator 423 of the lens part 420 is not applied to devices such as the image sensor 441.

Accordingly, various noise can be effectively blocked.

In addition, the boss pin 433 having the conductive layer 425 is formed at the lower end portion of the holder 430. The boss pin 433 is thickly formed with the conductive layer 425 so that the boss pin 433 is coupled with the grounding hole 443. For example, the conductive layer 425 includes conducive epoxy. In addition, for example, at least two boss pins 433 may be formed.

Figure 21:
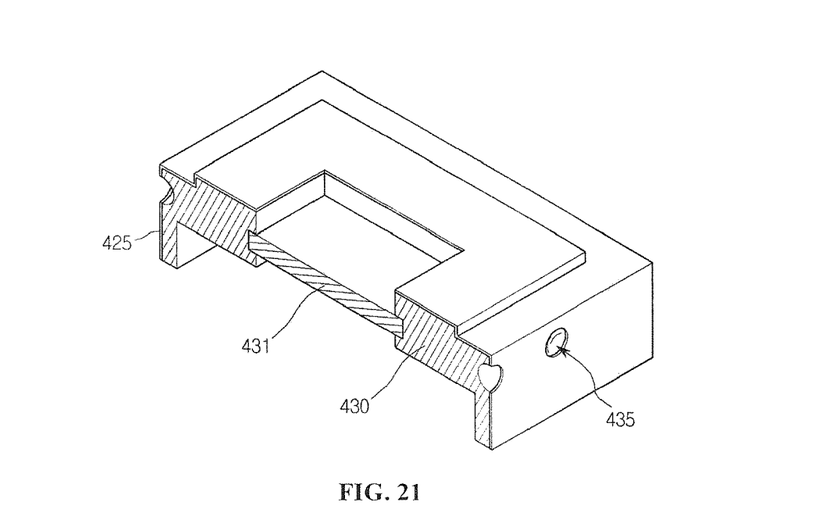
FIG. 21 is a vertical section view of a holder formed with a groove according to the embodiment.
Figure 22:
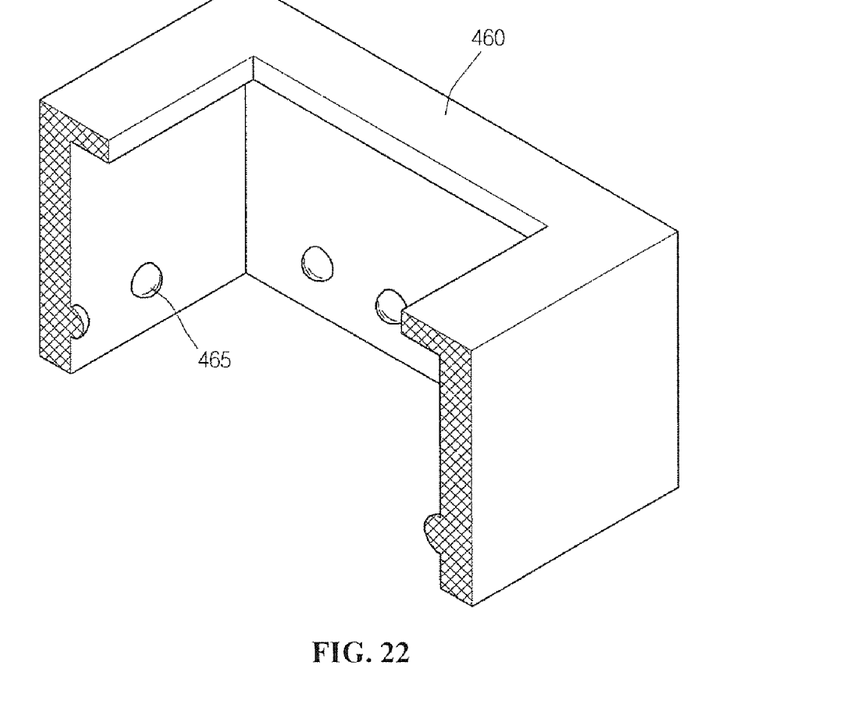
FIG. 22 is a vertical sectional view showing a cap formed with a protrusion according to the embodiment.

The holder formed with the groove and the cap formed with the protrusion will be described below with reference to FIGS. 21 and 22. FIG. 21 is a vertical sectional view showing the holder formed with the groove according to the embodiment, and FIG. 22 is a sectional view showing the cap formed with the protrusion according to the embodiment.

The conductive layer 425 is formed on the outer surface of the holder 430. The groove 435 is formed in a hemisphere shape at the outer side surface of the holder 430. At least one groove 435 may be formed at the outer side surface of the holder 430. The protrusion 465 corresponding to the groove 435 having the hemisphere shape is formed at the inner side surface of the cap 460. The protrusion 465 of the cap 460 is coupled with the groove 435 of the holder 430, thereby enhancing a coupling force between the cap 460 and the holder 430 and preventing the cap 460 from being separated from the holder 465 in the shock test such as a drop test.

Figure 23:
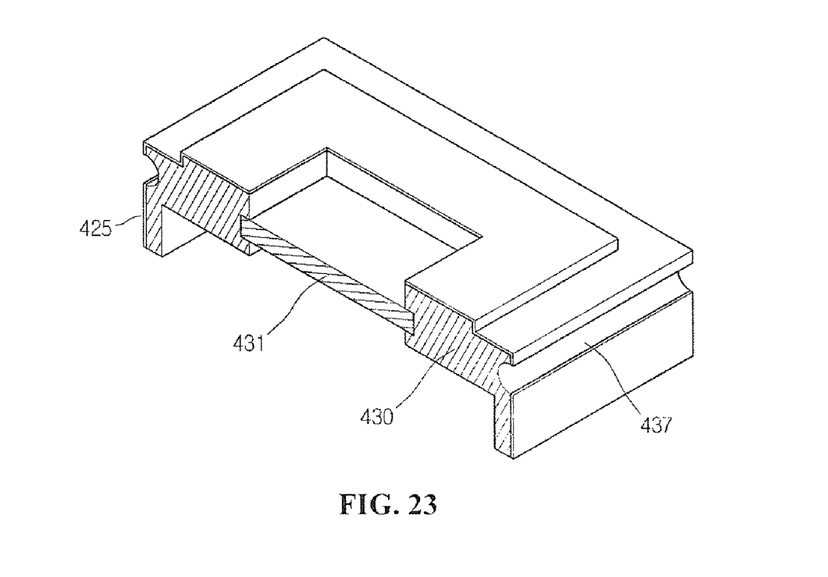
FIGS. 23 and 24 are views showing a groove and a protrusion according to another embodiment.
Figure 24:
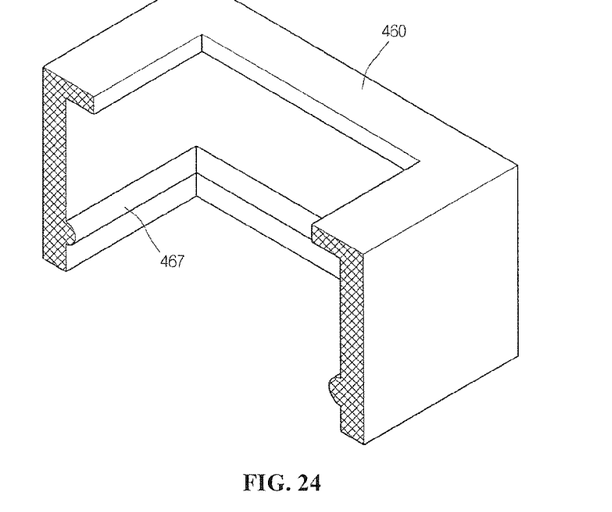

The above groove 435 and the above protrusion 465 may be manufactured in the various shapes in addition to the hemisphere shape. FIGS. 23 and 24 are views showing the groove and the protrusion having different shapes according to another embodiment.

The conductive layer 425 is formed at the outer surface of the holder 430. In addition, a groove 437 having a cylindrical shape is formed at the outer side surface of the holder 430. The groove 437 may be formed at least one at the outer side surface of the holder 430.

The protrusion 467 corresponding to the groove 437 is formed at the inner side surface of the cap 460. The protrusion 467 of the cap 460 is coupled to the groove 437 of the holder 430, thereby enhancing the coupling force between the holder 430 and the cap 460, and preventing the cap 460 from being separated from the holder 430 in a shock test such as a drop test.

Figure 25:
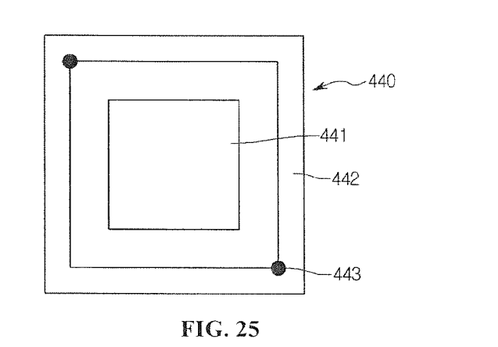
FIG. 25 is a plan view showing a printed circuit board according to the embodiment.
Figure 26:
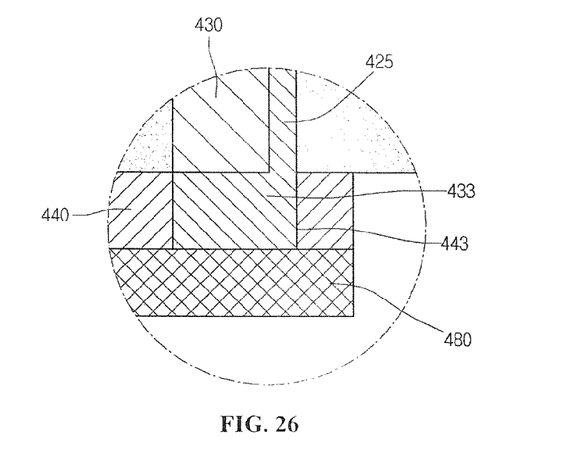
FIG. 26 is an enlarged view of a "B" part of FIG. 19.

FIG. 25 is a plan view showing a printed circuit board according to the embodiment, and FIG. 26 is an enlarged view showing a "B" part of FIG. 19.

The image sensor 441 is provided on the printed circuit board 440. The grounding hole 443 and the grounding pattern 442 are formed on the printed circuit board 440. For example, the grounding pattern 442 may be formed by removing the solder resist coated on the printed circuit board 440. The grounding hole 443 corresponds to the boss pin 433 formed at the lower portion of the holder 430. The boss pin 433 is inserted into the grounding hole 443, so that the boss pin 433 is grounded.

The boss pin 433 formed at the lower portion of the holder 430 is inserted into the grounding hole 443 of the printed circuit board 440. The holder 430 is coupled with the printed circuit board 440, so that the holder 430 is grounded.

In addition, the boss pin 433 may make contact with the conductive layer 480 formed on the bottom surface of the printed circuit board 440, and the conductive layer 480 makes directly contact with the grounding pad of the portable appliance, so that the conductive layer 480 may be grounded.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

In the camera module according to the embodiment, EMI, RF noise, and thermal noise may be effectively blocked

The invention claimed is:

1. A camera module comprising:
    a sensor part comprising a lens part comprising a lens and a lens barrel, a holder coupled with the lens part, a first printed circuit board disposed with an image sensor while supporting the holder, and a first conductive layer formed on the first printed circuit board;
    a second printed circuit board connected to the sensor part; and
    a connector connected to the second printed circuit board, wherein the second printed circuit board is a flexible printed circuit board and comprises a second conductive layer, and the connector comprises a third conductive layer,
    wherein the first printed circuit board extends under the holder.

2. The camera module according to claim 1, wherein a grounding area is formed at least one of the first printed circuit board, the second printed circuit board and the connector.

3. The camera module according to claim 1, wherein at least one of the conductive layers is electrically grounded.

4. A camera module comprising:
    a lens part comprising a lens, a lens barrel, and an actuator;
    a holder coupled with the lens part, in which a first conductive layer is formed on a surface of the holder;
    a printed circuit board electrically connected to the first conductive layer while supporting the holder;
    a boss pin integrally formed with the holder at a lower portion of the holder, wherein the boss pin is coupled with the printed circuit board to fix the holder to the printed circuit board; and
    a second conductive layer formed on a surface of the boss pin.

5. The camera module according to claim 4, comprising a third conductive layer formed on the lens part.

6. The camera module according to claim 4, comprising a grounding area electrically connected to the first conductive layer, and formed on the printed circuit board.

7. The camera module according to claim 6, wherein the grounding area is not formed with solder resist.

8. The camera module according to claim 4, comprising a cap formed at an outer portion of both the lens part and the holder.

9. The camera module according to claim 8, comprising a socket disposed at a lower portion of the printed circuit board, and coupled with the cap to support the cap.

10. The camera module according to claim 8, wherein a groove is formed in at least a portion of the holder, and a protrusion is formed in at least a portion of the cap corresponding to the groove.

11. The camera module according to claim 4, comprising a fourth conductive layer formed at a lower portion of the printed circuit board.

12. A camera module comprising:
a lens part comprising a lens and a lens barrel;
a holder coupled with the lens part and provided with an IR blocking filter;
a printed circuit board supporting the holder; and
a cap including a conductive material and configured to surround outer surfaces of the lens part and the holder,
wherein a first side surface of the holder faces a second side surface of the cap, wherein one of the first side surface and the second side surface includes a protrusion and the other of the first side surface and the second side surface includes a groove, and
wherein the cap is coupled to the outer surface of the holder by the protrusion inserted into the groove.

13. The camera module according to claim 12, wherein the protrusion is formed on the cap.

14. The camera module according to claim 12, wherein the protrusion is provided in plural.

15. The camera module according to claim 12, wherein one of the lens part and the holder includes a conductive material on outer peripheral surface.

16. The camera module according to claim 15, wherein the printed circuit board includes a grounding hole and the holder includes a boss pin, wherein the boss pin is inserted into the grounding hole and the conductive material is grounded.

17. The camera module according to claim 12, wherein the holder is coupled to the printed circuit board through a conductive epoxy.

* * * * *